March 29, 1966   G. W. DIGGENS   3,243,668
TANTALUM CAPACITOR WITH GLASS-TO-METAL SEAL
AND RESILIENT SUPPORT FOR TERMINAL
Filed June 29, 1962
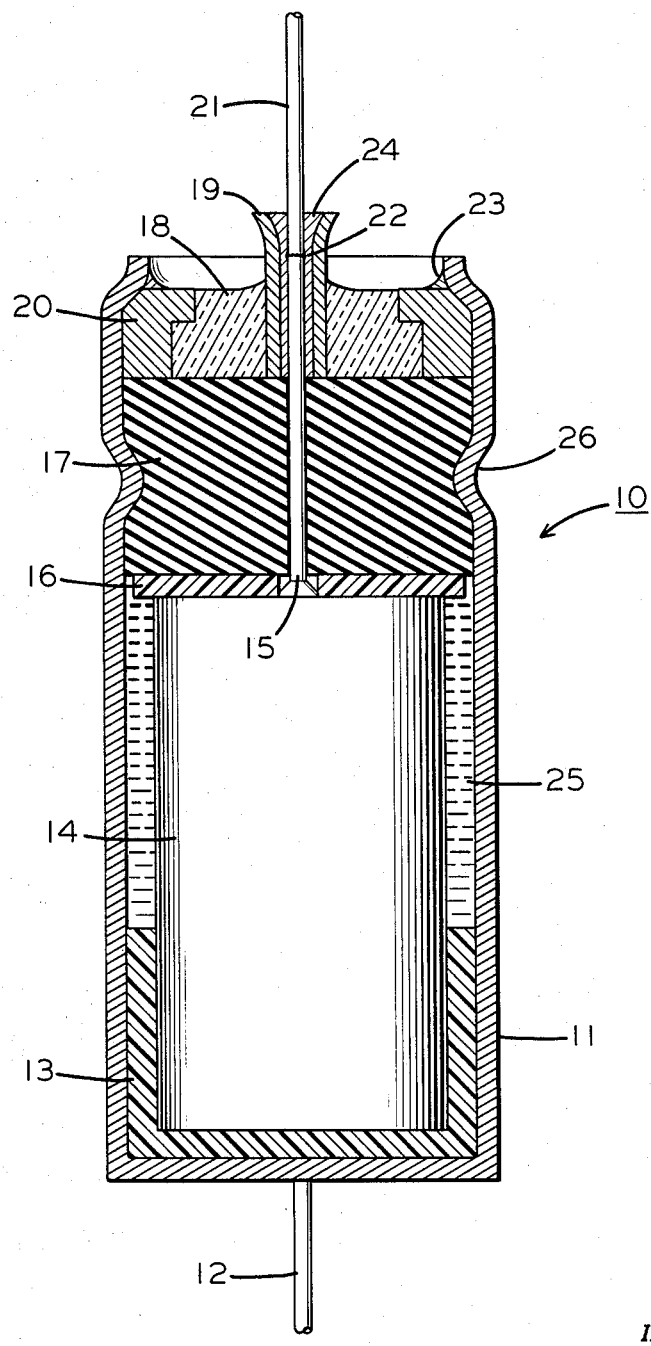
INVENTOR.
GEORGE W. DIGGENS
BY
Connolly and Hutz
HIS ATTORNEYS 3,243,668
TANTALUM CAPACITOR WITH GLASS-TO-METAL SEAL AND RESILIENT SUPPORT FOR TERMINAL
George William Diggens, North Adams, Mass., assignor to Sprague Electric Company, North Adams, Mass., a corporation of Massachusetts
Filed June 29, 1962, Ser. No. 206,328
2 Claims. (Cl. 317—230)

This invention relates to electrolytic capacitors, and more particularly to hermetically sealed, porous, sintered tantalum pellet type capacitors.

In electrolytic-tantalum pellet-type capacitors it is common to seal in the electrolyte with the aid of a resilient plug or gasket. This member is usually a synthetic material having rubber-like characteristics. Experience has revealed that the rubber-like gasket does not provide a good enough seal by itself. It has been proposed, therefore, to employ a combination seal of a rubber or rubber-like gasket and in association therewith, a glass-to-metal seal. While this combination seal is satisfactory for retaining the electrolyte, the resulting units suffered from a high D.C. leakage current. Microscopic examination of the units revealed that there was a noticeable change in the character of the oxide film at the point where it contacted the resilient gasket. The oxide changed from crystalline to amorphous and the characteristic voltage-dependent color of the oxide as formed, e.g. green, turned greyish in tone. The area in which the change occurred was clearly defined, not extending beyond the end of the pellet contacting the rubber. No reasonable theory has been developed which explains why the change occurs. It has, however, been determined that this is the cause of the high leakage current.

It is therefore an object of this invention to overcome the foregoing disadvantages.

It is another object of this invention to present a tantalum pellet capacitor having reduced leakage current.

Yet another object is to present a vibration-free tantalum pellet capacitor.

It is still another object of this invention to present a tantalum pellet capacitor having a permanently uniform dielectric oxide.

Other objects and advantages of the present invention will be made obvious to those skilled in the art by the following description when considered in relation to the accompanying drawing, of which:

The sole figure is a vertical, sectional view of the electrolytic capacitor of the invention.

It has been determined that the above-recited changes in the characteristics of the tantalum oxide are prevented by interposing an inert spacing material between the end of the tantalum pellet and the resilient gasket.

Referring to the drawing which illustrates an embodiment of the invention, there is shown an electrolytic capacitor generally designated by reference numeral 10. Capacitor 10 has a silver cathode casing 11 fashioned in the shape of an open-ended can or cup. A cathode terminal wire 12 is secured to the can in any suitable manner such as by welding. Situated within the can 11 is a bottom spacer 13 of polytetrafluoroethylene comprising a three-legged, clutching member adapted to hold anode 14 and keep it from touching the can. Anode 14 is a porous tantalum pellet which has a dielectric oxide formed on the total surface thereof. A tantalum rod or riser 15, also having an oxide film thereon, is integrally attached to anode 14. Between anode 14 and the wall of can 11 there is interposed an electrolyte 25, herein stated as being sulfuric acid. The electrolyte may be in its normal liquid state or rendered semi-solid by means of a thickening agent. Positioned about the riser 15 and surmounting anode 14 is a polytetrafluoroethylene (Teflon) spacer disc 16. Positioned about the riser 15 and abutting spacer disc 16 is a resilient copolymeric ethylene-propylene gasket 17. This gasket is held in place by an internal beading 26 of the can wall. Positioned against gasket 17 is a glass-to-metal seal. This seal is composed of a mass of glass 18 surrounding and fused to a tubular metal eyelet 19 and surrounded by and fused to a metal ring or washer 20. A solderable lead-wire 21 is butt-welded to the riser 15 at 22, which is a point about midway within eyelet 19. The end of the can is spun in slightly to temporarily hold the glass-to-metal seal in position and facilitate handling of the unit prior to soldering. The glass-to-metal seal, having been compressed against the resilient gasket 17, is soldered to the can as shown at 23. The butt-welded lead is held in place within the eyelet 19 by means of solder 24.

In essence, the foregoing structure defines an electrolytic capacitor hermetically sealed with a glass-to-metal seal, a resilient gasket insulating said seal from the electrolyte, an inert spacer separating said gasket from the formed tantalum pellet and an inert spacer separating said pellet from the metal can.

Completed units such as those described above have an extremely low leakage current. After an appropriate period of time the anodes of several units were examined and revealed no apparent change in the character of the oxide in the area which contacted the spacer disc. Since the pellet is firmly held between the bottom spacer and the spacer disc 16, the units were vibration free.

The metal employed for the capacitor case or tube is silver or silver plated brass. While a variety of metals may be employed as metal washer 20 and eyelet 19, tin-coated steel is preferred. Although polytetrafluoroethylene is preferred as spacing disc 16, any inert material which is chemically compatible with the electrolyte employed may also be used. The preferred material for the resilient gasket 17 is a high molecular weight copolymer of ethylene or propylene. Butyl rubber or neoprene may also be used. The glass-to-metal seal may be of the compression type or of the strain-free type wherein the parts of the seal have a more or less matched coefficient of thermal expansion. The solderable wire 21 may be any such metal, for example, nickel, etc.

It is to be understood that the invention is not to be limited by the specific embodiments hereof, except as defined in the appended claims.

What is claimed is:

1. A sealed electrolytic capacitor comprising a metal capacitor case containing a porous tantalum pellet anode having a tantalum riser extending therefrom and having a dielectric oxide film on the surfaces of said anode and riser, an inert spacer separating the anode from the capacitor case, an electrolyte, an inert spacer disc positioned about said riser and surmounting said anode, a resilient gasket seal positioned about said riser and abutting said spacer disc, a glass-to-metal seal positioned against said gasket seal, said glass-to-metal seal comprising a mass of glass surrounding and fused to a tubular metal eyelet and surrounded by and fused to a metal ring, said ring being soldered at its periphery to the case wall; and a solderable lead-wire butt-welded to said riser at a point within said tubular metal eyelet and held in place by solder.

2. The capacitor of claim 1 wherein said resilient gasket seal is polymeric ethylene-propylene and said spacer disc is polytetrafluoroethylene.

References Cited by the Examiner

UNITED STATES PATENTS

| | | | |
|---|---|---|---|
| 2,900,579 | 8/1959 | Rogers | 317—230 |
| 3,036,249 | 5/1962 | Hall | 317—230 |
| 3,056,072 | 9/1962 | Schroeder et al. | 317—230 |

JOHN W. HUCKERT, *Primary Examiner.*

JAMES D. KALLAM, *Examiner.*